United States Patent
Thoreau et al.

(10) Patent No.: US 9,031,332 B2
(45) Date of Patent: May 12, 2015

(54) DEVICE AND METHOD FOR COMPRESSING DIGITAL IMAGES

(75) Inventors: Dominique Thoreau, Cesson Sévigné (FR); Philippe Guillotel, Van sur Seiche (FR); Philippe Bordes, Laillé (FR); Edouard Francois, Bourg des Comptes (FR)

(73) Assignee: Thomson Licensing, Boulogne-Billancourt (FR)

( * ) Notice: Subject to any disclaimer, the term of this patent is extended or adjusted under 35 U.S.C. 154(b) by 2723 days.

(21) Appl. No.: 10/912,833

(22) Filed: Aug. 6, 2004

(65) Prior Publication Data

US 2005/0213655 A1    Sep. 29, 2005

(30) Foreign Application Priority Data

Aug. 7, 2003 (FR) .................................... 03 09713

(51) Int. Cl.
- G06K 9/36 (2006.01)
- H04N 19/34 (2014.01)
- H04N 19/176 (2014.01)
- H04N 19/115 (2014.01)
- H04N 19/154 (2014.01)

(52) U.S. Cl.
CPC .............. *H04N 19/34* (2014.11); *H04N 19/176* (2014.11); *H04N 19/115* (2014.11); *H04N 19/154* (2014.11)

(58) Field of Classification Search
USPC .......................... 375/240, 240.1; 382/223, 232
See application file for complete search history.

(56) References Cited

U.S. PATENT DOCUMENTS

| | | | |
|---|---|---|---|
| 6,198,768 B1 * | 3/2001 | Yamaguchi et al. | 375/240.01 |
| 2002/0150158 A1 * | 10/2002 | Wu et al. | 375/240.12 |
| 2003/0053545 A1 * | 3/2003 | Lainema et al. | 375/240.16 |
| 2003/0118096 A1 * | 6/2003 | Ishtiaq et al. | 375/240.1 |

FOREIGN PATENT DOCUMENTS

| | | | |
|---|---|---|---|
| JP | 2000-341692 | 12/2000 | |
| WO | 03-017673 A1 | 2/2003 | |
| WO | 03/036980 A1 | 5/2003 | ............... H04N 7/26 |

(Continued)

OTHER PUBLICATIONS

Domanski et al., "Fine Granularity in Multi-Loop Hybrid Coders with Multi-Layer Scalability", Jun. 2002, IEEE, vol. 3, pp. 741-744.*

(Continued)

*Primary Examiner* — John Strege
(74) *Attorney, Agent, or Firm* — Robert D. Shedd; Iuliana Tanase

(57) ABSTRACT

The present invention relates to a device for compressing a source image by means of a base layer, coding a base image, and of an enhancement layer, coding a residual existing between the source image and the base image, the source image and the base image being structured as blocks of pixels. According to the invention, such a device is characterized in that it comprises means for generating the enhancement layer of a block as a function of the quality of restitution of this block, determined by comparing the coding of this block in the source image with the coding of this block in the base image, and/or as a function of information coded by this block of pixels.

33 Claims, 4 Drawing Sheets

(56) References Cited

FOREIGN PATENT DOCUMENTS

WO     WO 03/036980     *     5/2003     ............... H04N 7/26
WO     WO 03/036980 A1     *     5/2003     ............... H04N 7/26

OTHER PUBLICATIONS

Title "Content-Based Selective Enhancement for Streaming Video" M. van der Schaar et al., Proceedings 2001 Inter. Conf. on Image Processing ICIP 2001 pp. 977-980.
Title: A Hybrid Embedded Video Codec Using Base Layer Information for Enhancement Layer Coding:, Eugene Lin et al., Proceedings 2001 Inter. Conf. on Image Processing ICIP 2001 pp. 1005-1008.
N3317—Title: "FGS Verification Model" Version 1-6, 25, 4.0 Draft of Apr. 11, 2000, pp. 1-35 XP-00926359.
LIW Title: "Overview of Fine Granularity Scalability in MPEG-4 Video Standard", iEEE Transactions on Circuits and Systems for Video Technology vol. 11, No. 3 Mar. 2001 pp. 301-317.
Makajima et al., "Method for Macroblock Selection on an MPEG-4 FGS Layer", Report of Information Processing Society of Japan, vol. 2003, No. 24 (2003-AVM-40), published by Information Processing Society of Japan, Mar. 7, 2003, pp. 1-6, ISSN: 0919-6072. (Partial Translation Provided).
The Institute of Image Information and Television Engineers, "Selection of Comprehensive Multimedia Books, MPEG", First Edition, pp. 119-121, Ohmsha, Ltd., Apr. 20, 1996, ISBN: 4-274-07840-X.
Wang et al., "Optimal Rate Allocation for Progressive Fine Granularity Scalable Video Coding", Proc of Int. Conf. on Coding and Computing, Apr. 2001, pp. 332-335, ISBN: 0-769501062-0.
Li et al., "MPEG-4 Video Verification Model version 18.0," ISO/IEC JTC1/SC291WG11, Doc. No. N3908, Jan. 2001, 508 pages.

* cited by examiner

FIG_1

| Residuals | 5 | 10 | 0 | 1 | 7 | 8 | 19 | 2 | 0 | 3 | 1 | 20 | 12 | 5 | 0 | 0 |
|---|---|---|---|---|---|---|---|---|---|---|---|---|---|---|---|---|
| $2^4$ | 0 | 0 | 0 | 0 | 0 | 0 | 1 | 0 | 0 | 0 | 0 | 1 | 0 | 0 | 0 | 0 |
| $2^3$ | 0 | 1 | 0 | 0 | 0 | 1 | 0 | 0 | 0 | 0 | 0 | 0 | 1 | 0 | 0 | 0 |
| $2^2$ | 1 | 0 | 0 | 0 | 1 | 0 | 0 | 0 | 0 | 0 | 0 | 1 | 1 | 1 | 0 | 0 |
| $2^1$ | 0 | 1 | 0 | 0 | 1 | 0 | 1 | 1 | 0 | 1 | 0 | 0 | 0 | 0 | 0 | 0 |
| $2^0$ | 1 | 0 | 0 | 1 | 1 | 0 | 1 | 0 | 0 | 1 | 1 | 0 | 0 | 1 | 0 | 0 |

- MSB ~ 120
- MSB⁻¹ ~ 121
- MSB⁻² ~ 122
- MSB⁻³ ~ 123
- LSB ~ 124

| MSB | MSB⁻¹ | MSB⁻² | - - - |
|---|---|---|---|

130

Direction of reading →

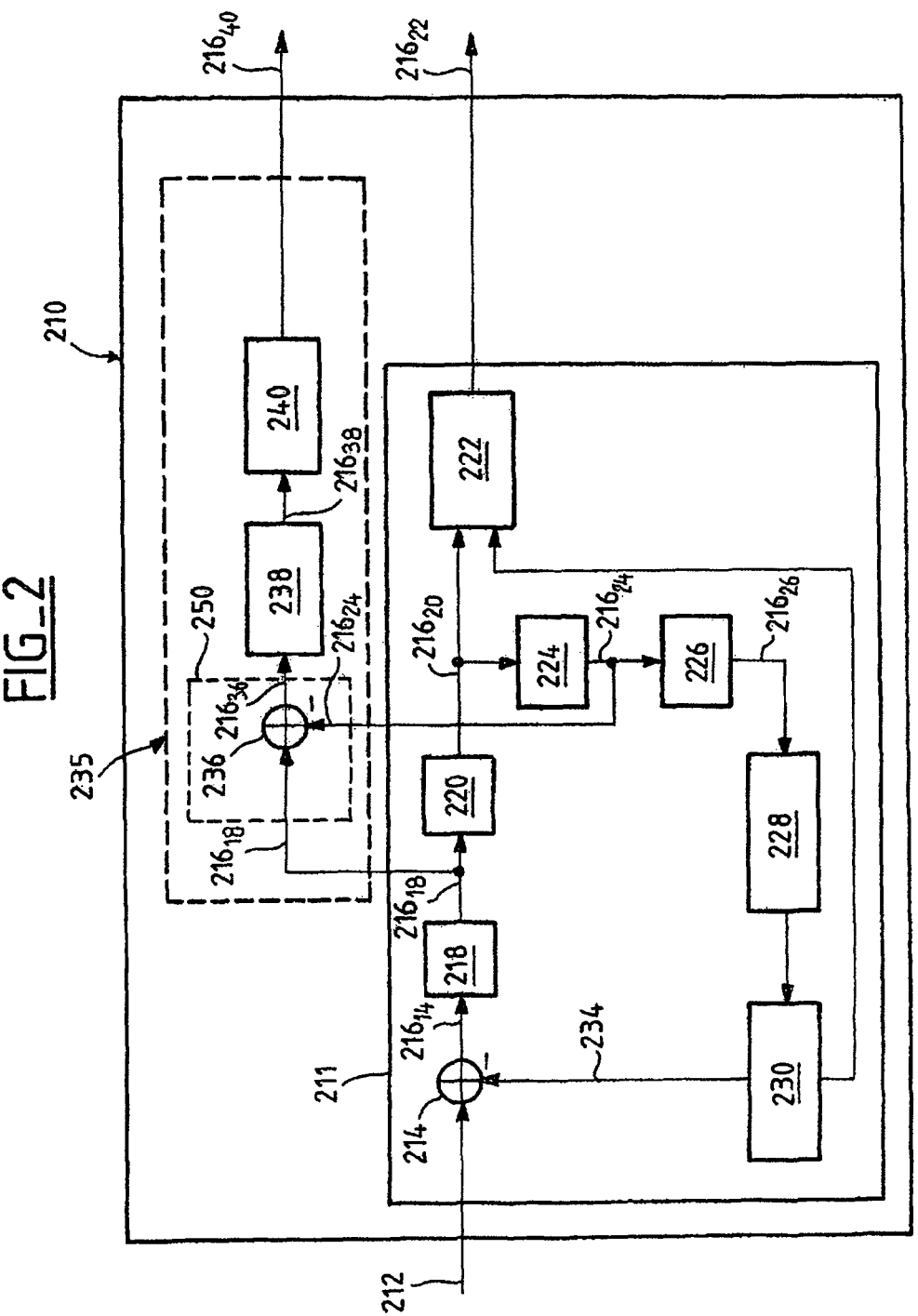
FIG_2

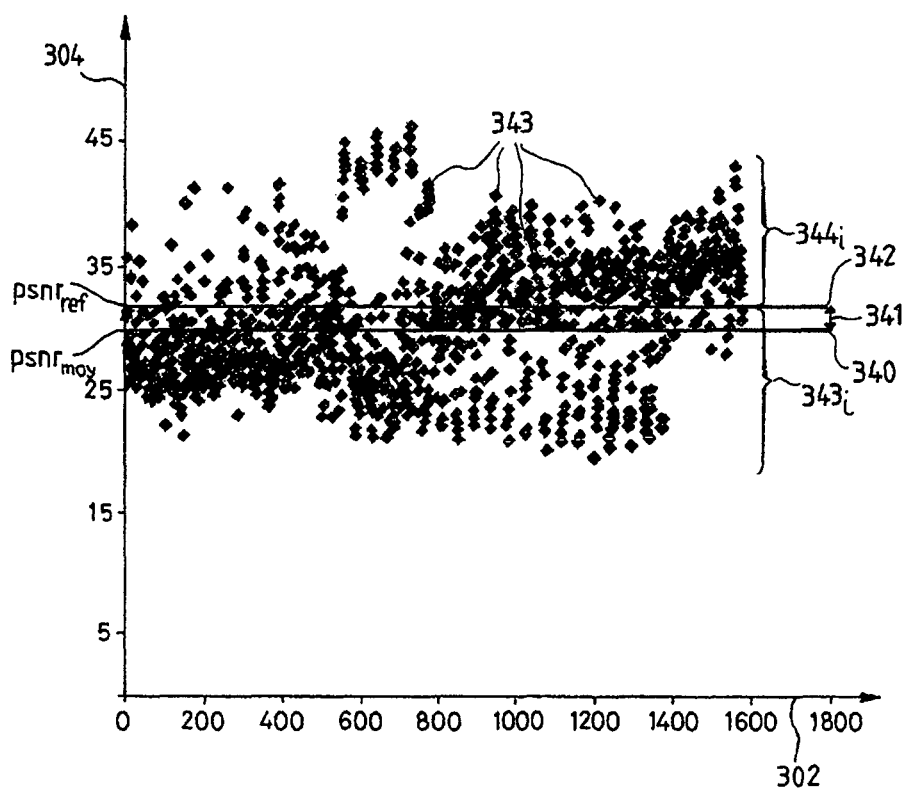

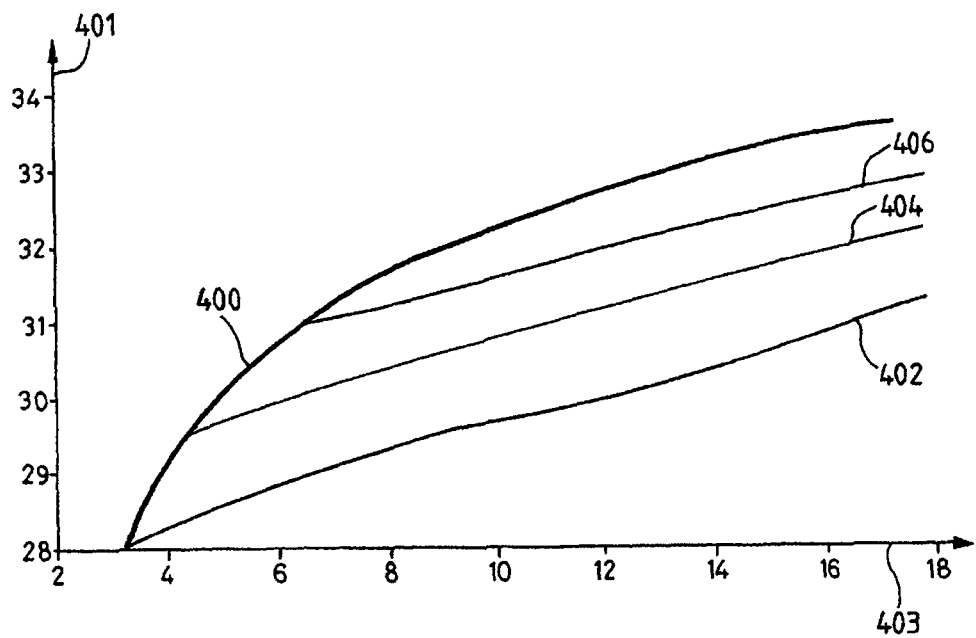
FIG_4

DEVICE AND METHOD FOR COMPRESSING DIGITAL IMAGES

This application claims the benefit, under 35 U.S.C. §119 of French Patent Application 0309713, filed Aug. 7, 2003.

FIELD OF THE INVENTION

The present invention pertains to a device and to a method for compressing digital images.

BACKGROUND OF THE INVENTION

The compression of a digital image reduces the quantity of data necessary for its transmission via, for example, a telecommunication network such as the Internet network.

Certain compression standards, such as the MPEG-4 standard (Motion Picture Expert Group 4), use a so-called multi-layer compression according to which an image, the so-called source image, is compressed by means of a base layer, coding a so-called base image, and of an enhancement layer, coding the deviation or the residual between the source image and the base image.

In this case, the transmission of a compressed image can be done by transmitting, firstly, its base layer and then, secondly, its enhancement layer, in the form of binary trains.

The binary train associated with the enhancement layer has the advantage of being able to be truncated in such a way that, if transmission thereof is performed only partially following, for example, a variation in the transmission throughput in the network, the information transmitted in the correctly received part of the binary train may nevertheless still be used to enhance the image coded by the base layer.

To do this, a residual 101 (FIG. 1), coding enhancement coefficients $101_1$, $101_2$, ... $101_n$ specific to each block of pixels forming the image, is decomposed into various planes MSB, $MSB^{-1}$, $MSB^{-2}$, $MSB^{-3}$ and LSB of bits ranked in order of priority, each plane MSB, $MSB^{-1}$, $MSB^{-2}$, $MSB^{-3}$ or LSB clustering together bits of like weight in the decomposition of the residual specific to each block.

As described later, these coefficients $101_1$, $101_2$, ... $101_n$ may arise from the discrete cosine transformation DCT of an 8x*8 block of pixels, performed by evaluating the difference between the DCT coefficients of a block of a source image, that is to say of the coded image, and the DCT coefficients of an image processed by a quantization and then by an inverse quantization of its base layer.

By generating a binary train 130 successively transmitting the planes MSB, $MSB^{-1}$, $MSB^{-2}$, $MSB^{-3}$ or LSB, one then obtains an enhancement layer which can be truncated without compromising the transmission of the train as a whole. For example, if the transmission of the train 130 is disturbed during the transmission of the plane $MSB^{-3}$, the information as a whole already transmitted by the planes MSB, $MSB^{-1}$, $MSB^{-2}$ and the transmitted part of $MSB^{-3}$ will be able to be taken into account to enhance the image.

Such a method, dubbed Fine Granularity Scalability (Fgs) within the framework of the MPEG4 standard, has the drawback of using a compression of the residual having an efficiency lower than the efficiency of the compression of the base code. In this way, a compromise between the efficiency of the compression, increased by a base layer of significant size, and the security of the transmission of the base, increased with a base layer of small size, may possibly be made.

SUMMARY OF THE INVENTION

The present invention remedies this drawback. It pertains to a device for compressing a source image by means of a base layer, coding a base image, and of an enhancement layer, coding a residual existing between the source image and the base image, the source image and the base image being structured as blocks of pixels, characterized in that it comprises means for generating the enhancement layer of a block as a function of the quality of restitution of this block, determined by comparing the coding of this block in the source image with the coding of this block in the base image, and/or as a function of information coded by this block of pixels.

By considering the quality of restitution of the image on the basis of the base layer blockwise, the device in accordance with the invention makes it possible to optimize the generation of the enhancement layer by assigning each block a quantity of bits in the enhancement layer dependent on the base coding of this block so that the final image has a uniform quality of restitution.

Moreover, by taking into account the information relating to the coding of each block, the device in accordance with the invention optimizes the generation of the base layer by allotting more data to blocks of pixels for which an enhancement of the base layer results priority-wise, for example if resolution defects associated with this block are more visible than for other blocks.

In one embodiment, the device comprises means for determining the quality of restitution of the block (k) by means of a formula such as:

$$psnr_k = -10 \, \text{Log}\left(\sum_{i,j=0}^{i,j=7}(block_{k,source}(i,j) - block_{k,rec}(i,j))^2\right) / (L^2 \times 64)$$

where (i,j) represents the coordinates of a pixel of the block (k) considered, for example of dimensions 8×8, in the source image ($block_{source}$) or in the base image ($block_{rec}$) coded by the base layer, L representing the value of the maximum luminance of the image, for example equal to 255.

According to one embodiment, the device comprises means for defining an average quality $Psnr_{avg}$ of restitution of the image and for allocating a greater number of bits in the enhancement layer to the blocks whose restitution quality is less than this average quality $Pnsr_{avg}$ or than a reference quality $Pnsr_{ref}$ obtained on the basis of this average quality, for example by adding a quality margin.

In one embodiment, the device comprises means for comparing the quality $psnr_k$ of restitution of the block k with a reference quality $psnr_{ref}$ in such a way as to detect a deviation $\delta psnr_k$ of quality with respect to this reference $psnr_{ref}$ and means for allotting a number $NbBits_k$ of bits of the enhancement layer to this block as a function of this deviation.

According to one embodiment, the device comprises means for allotting a number $NbBits_k$ of bits of the enhancement layer by using a proportionality relation such as:

$$NbBits_k = \frac{\delta psnr_k}{\Delta psnr} \times throughput_{fgs}$$

where $throughput_{fgs}$ is the quantity of bits per image contained in the train of the enhancement layer and $\Delta psnr$ is a sum of deviations $\delta psnr_k$ measured for the block considered.

In one embodiment, the sum Δpsnr is evaluated on the basis of the deviations between the quality of each block and the reference quality, for example by means of a formula such as:

$$\Delta psnr = \sum_{k=0}^{k=M\times N-1} (\text{if } (psnr_k < Psnr_{ref}) : Psnr_{ref} - psnr_k)$$

where M and N are parameters relating to the index number of each block in the image, a block being considered only if its quality $psnr_k$ of restitution is less than the reference quality of restitution ($psnr_k < psnr_{ref}$).

According to one embodiment, the device comprises means for estimating the quality of restitution of the base layer by estimating the degradation, or the cost CostFlti, of its filtering intended to reduce contrasts between neighbouring blocks and means for allotting to a block (k) of pixels a bigger number $NbBits_k$ of bits of the enhancement layer the higher this cost CostFlti.

In one embodiment, the device comprises means for estimating the cost CostFlti of the filtering with the aid of a formula such as:

$$CostFlt_i = \frac{\left(\sum_{i,j=0}^{i,j=7} abs(block_{baseFiltered}^i(i,j) - block_{base}^i(i,j))\right)}{64}$$

where abs is the absolute value function, and $block_{basefiltered}(i,j) - block_{base}(i,j)$ represents the difference in values of the pixel with coordinates i and j of the base layer after filtering and before filtering.

According to one embodiment, the device comprises means for comparing the cost of filtering $costFlt_i$ of a block with a cost of filtering of the image COSTFlt and means for allotting a number $NbBitsfgs_i$ of bits of the enhancement layer to each block i as a function of this comparison, for example by using a relation such as:

where $throughput_{fgs}$ is the quantity of bits per image contained in the train of the enhancement layer.

$$NbBitsfgs_i = throughput_{fgs} \times \frac{costFlt_i}{COSTFlt}$$

In one embodiment, the device comprises means for determining the cost costFlt of filtering of the image by adding up the costs of filtering of all the blocks of the image, for example with the aid of a formula such as:

$$COSTFlt = \sum_{i=0}^{i=M\times N-1} (costFlt_i)$$

where i represents a block index number whilst M and N represent the dimensions of the image.

According to one embodiment, the device comprises means for generating the enhancement layer of a block as a function of a parameter relating to an average luminance (Lavg) associated with this block, determined for example by adding up the luminances of the pixels of the block considered.

In one embodiment, the device comprises means for weighting the cost of the filtering of a block as a function of a coefficient $F(Lavg_i)$ whose value depends on the average luminance of this block.

According to one embodiment, the device comprises means such that, if the average luminance $Lavg_i$ of a block is greater than a threshold, ThreshLum, then the value of this weighting coefficient is calculated according to the formula:

$$F(Lavg_i) = 1 - (Lavg_i/2 \times ThreshLum)$$

whereas, otherwise, the value of this weighting coefficient is constant, for example equal to ½.

In one embodiment, the device comprises means for weighting the cost of the filtering as a function of a coefficient $F(Lavg_i)$ whose value depends on the texture, or activity, of the considered block of pixels.

According to one embodiment, the device comprises means such that the activity $Act_i$ of a block i is calculated by means of a formula such as:

$$Act_i = MAX\left(\underset{i,j=0}{\overset{i=6,j=7}{MAX}}|b_{i,src}(k,l) - b_{i,src}(k+1,l)|, \underset{i,j=0}{\overset{i=7,j=6}{MAX}}|b_{i,src}(k,l) - b_{i,src}(k,l+1)|\right)$$

where k and l are the coordinates of the pixels contained in a block, $b_{i,src}$ being a block of index i of the source image and max (a,b) is equal to a when a is greater than b, and equals b otherwise.

In one embodiment, the device comprises means such that the cost of the filtering of a block is weighted by means of a factor ($F(Act_i)$) dependent on its activity.

In one embodiment, the device comprises means such that the weighting factor $F(Act_i)$ varies between 0.5 and 1 as a function of a threshold ThreshAct such that, if the activity $Act_i$ of the block i considered is less than this threshold ThreshAct then the coefficient $F(Act_i)$ is equal to:

$$F(Act_i) = 1 - (Act_i/2 \times ThreshAct)$$

whereas this threshold is constant otherwise.

According to one embodiment, the device comprises means for generating the enhancement layer by considering a motion or displacement vector associated with each pixel block i, for example by means of the formula:

$$Vect_i = \sqrt{Vx^2 + Vy^2}$$

where the components Vx and Vy represent the horizontal and vertical displacements of the block.

According to one embodiment, the device comprises means such that the cost of the filtering of a block is weighted by means of a factor $F(Vect_i)$ dependent on the motion vector of this block.

In one embodiment, the device comprises means such that the weighting factor $F(Vect_i)$ varies between 0 and 1 as a function of a motion threshold ThreshVect, for example such that if the norm of the vector $Vect_i$ is less than this threshold ThreshVect, then this factor equals:

$$F(Vect_i) = 1 - (Vect_i/ThreshVect)$$

whereas this factor $F(Vect_i)$ is zero otherwise.

According to one embodiment, the device comprises means for generating the enhancement layer by considering the possible exit of the block in an image subsequent to the image considered.

In one embodiment, the device comprises means for anticipating the exit of the block from the image by adding the components Vx and Vy of the displacement vector Vect of this block $ib_{next}=ib+Vx$ and $jb_{next}=jb+Vy$ to the coordinates ib and jb of this block, in such a way that if the estimated position of the block at the next image is outside the image ($ib_{next}<0$) or ($ib_{next}>M$) or ($jb_{next}<0$) or ($jb_{next}>N$), M and N being the dimensions of the image, the enhancement layer of this block is not processed.

In one embodiment, the device comprises means for estimating the quality psnr of restitution of a block of pixels with the aid of an affine modelling such that the quality psnr of restitution of an image has a linear form:

$$psnr = Dpsnr.x + b$$

where Dpsnr is a constant equal, for example, to 0.212 dB/bit per block and x represents the allotted number of bits per block.

According to one embodiment, the device comprises means for generating the enhancement layer by allotting more bits to the blocks of an image if this image is used to generate other images, for example in the case of an inter-image predictive coding.

In one embodiment, the device comprises means for coding the base layer with the aid of a discrete cosine transform.

The invention also relates to a method for compressing a source image by means of a base layer, coding a base image, and of an enhancement layer, coding a residual existing between the source image and the base image, the source image and the base image being structured as blocks of pixels, characterized in that a device is used which generates the enhancement layer of a block as a function of a quality of restitution of this block, in accordance with one of the preceding claims.

BRIEF DESCRIPTION OF THE DRAWINGS

Other characteristics and advantages of the invention will become apparent with the description of the invention given hereinbelow, by way of nonlimiting example, while referring to the appended figures in which:

FIG. 1, already described, represents a method of coding an enhancement layer according to a known method, FIG. 2 is a diagram of a compressor of images coded according to a multilayer method in accordance with the graphical invention, FIG. 3 represents a distribution of variable restitution qualities for various blocks of one and the same image, and FIG. 4 represents variations of efficiency during a multilayer coding.

DETAILED DESCRIPTION OF PREFERRED EMBODIMENTS

A coder 210 (FIG. 2) in accordance with the invention can comprise a receiver 211 receiving a signal 212 which codes an image to be compressed. Within the framework of coding in inter-image modes, this receiver 211 subtracts from this signal 212 information already transmitted for a previous image. This operation is performed with the aid of a subtractor 214 which receives a signal 234 corresponding to the information transmitted for the previous images.

Thus, the signal 212 is transformed into a signal $216_{14}$, which is directed to a transformer 218 which transforms the signal $216_{14}$, defined in the spatial domain, into a signal $216_{18}$ defined in the frequency domain. This operation, which is performed with no loss of information, is a discrete cosine transform or DCT.

The signals $216_{18}$ are transmitted to a quantizer 220 which reduces the dynamic swing of these signals via a quantization operation which involves approximations entailing a non-negligible loss of information of the signal $216_{18}$.

The information thus lost during this quantization operation is called the residual (residual information intended for the fgs coder), whereas the information retained after quantization constitutes the base layer of the compressed image.

Stated otherwise, the base layer comprises the data received by the coder minus this residual, the latter being coded by the enhancement layer as described later.

On exit from the quantizer 220, the signal $216_{20}$ is also transmitted to a subtraction loop which comprises an inverse quantizer 224 performing the inverse function of the quantizer 220. This inverse quantization operation is performed without any new loss of information.

One then obtains a signal $216_{24}$ which is applied to a converter 226 performing the inverse function (IDCT) to that carried out by the transformer 218, that is to say converting this signal $216_{24}$ from the frequency domain to the spatial domain, thus outputting a signal $216_{26}$ which is transmitted to a memory 228 and a motion estimation/compensation processor 230 then to the subtractor 214.

The signal $216_{24}$ is also transmitted to a subtractor 236, forming part of a branch 235 for generating the enhancement layer, a second input of the subtractor 236 receiving the output signal $216_{18}$ from the DCT transformer 218.

Thus, this subtractor 236 performs the subtraction between signals representing the signals received $216_{18}$ and sent $216_{24}$ so as to obtain the residual $216_{36}$ on output from the subtractor 236.

The branch 235 comprises a memory 238 which stores the residuals (in the spatial frequency domain) imagewise and a device 240 which performs the partition into enhancement planes of the signal $216_{38}$ on exit from the memory 238 according to the standardized method known as "Fine granularity scalability" (FGS) already described.

Furthermore, the branch 235 comprises means 250 for analysing the blocks of pixels compressed in such a way as to determine their quality of restitution, on the basis of the base layer, and for determining, as a function of this quality and of information relating to the coding of the pixels of a block considered, what quantity of bits should be allotted to this block at the enhancement layer level.

In this embodiment of the invention, the quality or "$psnr_k$" of restitution is measured, for a block k of pixels, by means of the following formula:

$$psnr_k = -10 \, \text{Log}\left( \sum_{i,j=0}^{i,j=7} (block_{k,source}(i,j) - block_{k,rec}(i,j))^2 \right) \Big/ (8 \times 8 \times 255^2)$$

where (i,j) represents the coordinates of a pixel of the block considered, for example of dimensions 8×8, in the source image ($block_{source}$) or in the reconstructed base image ($block_{rec}$) coded by the base layer.

By means of the quality of restitution $psnr_k$ calculated for each block k of pixels, it is possible to calculate the average quality of restitution $psnr_{avg}$ of the image, for example by averaging the qualities psnr of restitution of each of the blocks of the image or by using a graphical procedure as described later.

Finally, a reference restitution quality $psnr_{avg}$ specific to the image is obtained on the basis of the average quality $Psnr_{avg}$ to which is added a margin, for example, of 3 dB.

$$Pnsr_{ref} = Psnr_{avg} + 3\ dB.$$

Thereupon, each measurement of restitution quality $psnr_k$ is compared with the reference $psnr_{ref}$ to detect a possible defect $\delta psnr_k$ of quality of restitution, that is to say a deficit in terms of quality of restitution with respect to the threshold $psnr_{ref}$ defined.

As a function of this possible deficit $\delta psnr_k$ in terms of quality of restitution, one allots a certain number $NbBits_k$ of bits on the train of the enhancement layer by using a proportionality relation such as:

$$NbBits_k = \frac{\delta psnr_k}{\Delta psnr} \times throughput_{fgs}$$

where $throughput_{fgs}$ corresponds to the throughput allotted to the image within the framework of the coding dedicated to the enhancement layer and $\Delta psnr$ represents the global deficit of the image, evaluated on the basis of the deviations between the quality of each and the reference quality, for example by means of a formula such as:

$$\Delta psnr = \sum_{k=0}^{k=M \times N-1} (\text{if } (psnr_k < Psnr_{ref}): Psnr_{ref} - psnr_k)$$

where M and N are parameters relating to the index number of each block in the image, a block being considered only if its quality $psnr_k$ of restitution is less than the reference quality of restitution ($psnr_k < psnr_{ref}$).

Such an operation is illustrated with the aid of FIG. 3 which represents blocks 343, identified by their block index number (abscissa axis 302) and for which the quality $psnr_k$ of restitution (ordinate axis 304) has been determined in accordance with the formula indicated above.

A reference quality $psnr_{ref}$ 342 is defined on the basis of an average quality of restitution 340 and of a predetermined quality margin 341.

In accordance with the invention, no coding is performed in the enhancement layer for blocks 343i whose quality of restitution is greater than the reference threshold whereas an enhancement coding is performed for the blocks of pixels whose restitution quality is less than the reference quality ($psnr_{ref}$), a bigger number of bits being allotted to this coding the higher this deviation.

Another enhancement layer generation parameter taken into account by the means 250 (FIG. 2) is the variation of the information in a block after its filtering intended to reduce any block effects, that is to say the problems of contrast existing between two neighbouring pixel blocks.

For this purpose, it is appropriate to recall that such a filtering is performed at the base layer level in an optional manner at the decoder level in the case of the MPEG4 standard.

Nevertheless, this post-filtering can be carried out at the coder level so as to estimate the rendition on the reconstructed image of the base layer vis-à-vis the source image.

In the latter case, the post-filtering does not intervene in the loop of the inter-image coding process which then serves only to estimate the degradation between the decoded image (of the base layer) and the source image.

On the other hand, if a filter is present in this loop, the degradation estimation operation can be carried out therein. Such is the case within the framework of the h263, h261 and MPEF-4 part 10 standards.

To do this, one can evaluate a cost (costflti) of filtering by means, for example, of the following formula:

$$costFlt_i = \frac{\left( \sum_{i,j=0}^{i,j=7} \text{abs}(block_{baseFiltered}^i(i,j) - block_{base}^i(i,j)) \right)}{64}$$

where abs is the absolute value function, and $block_{basefiltered}(i,j) - block_{base}(i,j)$ represents the difference in quality at the level of the block comprising the pixel with coordinates i and j, belonging to the decoded image (of the base layer) after filtering and before filtering intended to reduce the block effects.

On the basis of the cost of the filtering of a block of pixels it is possible to calculate a total cost COSTFlt for the image by summing the $costFlt_i$ specific to each block such that:

$$COSTFlt = \sum_{i=0}^{i=M \times N-1} (costFlt_i)$$

Finally, it is possible to determine the number of bits to be allotted in the data train of the enhancement layer to a block as a function of the following formula:

$$NbBitsfgs_i = throughput_{fgs} \times \frac{costFlt_i}{COSTFlt}$$

In this embodiment, a significant coding of the enhancement layer of a pixel block is also favoured if this block is situated in a zone of an image where the luminance is low. In fact, the anomalies of an image are more visible in the dark zones of this image.

For this purpose, the average luminance of each block is calculated in such a way that the blocks whose average luminance is lower benefit from increased coding in the enhancement layer.

This average luminance Lavg can be calculated by:

$$Lavg_i = \sum_{k,l=0}^{k,l=7} (block_{i,source}(k,l)/64)$$

k and l being the coordinates of the pixels contained in the block i.

Application on the basis of the block effect (post-filtering) measured on completion of the post-filtering can be effected in the following manner:

The calculation of the filtering cost, relating to the image, weighted with local average luminance $$COSTFlt = \sum_{i=0}^{i=M \times N-1} (costFlt_i) * F(Lavg_i)$$

The distribution of the number of bits per block then becomes:

$$NbBitsfgs_i = throughput_{fgs} \times \frac{costFlt_i * F(Lavg_i)}{COSTFlt}$$

$F(Lavg_i)$ being a weighting function which varies between 0.5 and 1. In this embodiment, if the luminosity $Lavg_i$ of a block i is less than a threshold $Thresh_{Lum}$ ($Lavg_i < Thresh_{Lum}$), then this function may be written: $F(Lavg_i)=1-(Lavg_i/2\times Thresh_{Lum})$.

Otherwise, this weighting function $F(Lavg_i)$ may be kept constant, for example equal to ½, this approach making it possible to favour the blocks with low luminance vis-à-vis those with high luminance.

It is appropriate to note that the threshold value $Thresh_{Lum}$ exhibits a maximum luminance (255).

In this embodiment, a significant coding of the enhancement layer of a pixel block is also favoured if this block is situated in a zone of an image where the texture is weak since a restitution defect located in a weakly textured zone is more visible than in a zone with strong texture.

For this purpose, this texture is measured by an activity $Act_i$ inside the block i evaluated for example, as follows:

$$Act_i = \mathrm{MAX}\left( \underset{i,j=0}{\overset{i=6,j=7}{\mathrm{MAX}}} |b_{i,src}(k,l) - b_{i,src}(k+1,l)|, \underset{i,j=0}{\overset{i=7,j=6}{\mathrm{MAX}}} |b_{i,src}(k,l) - b_{i,src}(k,l+1)| \right)$$

k and l being the coordinates of the pixels contained in the block, $b_{i,src}$ being a block of index i of the source image and max(a-b) being equal to a if a is greater than b or equal to b otherwise.

Application on the basis of the block effect measured on completion of the post-filtering may then be effected by calculating the cost of the filtering, relating to the image, weighted with the local activity determined as indicated above:

$$COSTFlt = \sum_{i=0}^{i=M\times N-1} (costFlt_i) * F(Act_i)$$

The blockwise distribution of the number of bits then becomes:

$$NbBitsfgs_i = throughput_{fgs} \times \frac{costFlt_i * F(Act_i)}{COSTFlt}$$

$F(Lavg_i)$ being a weighting function which varies between 0.5 and 1 in a similar manner to the weighting function described above. In this example, if the activity $Act_i$ is less than a given threshold $Thresh_{Act}$, then this weighting coefficient $F(Act_i)$ is determined by the following formula:

$$F(Act_i)=1-(Act_i/2\times ThreshAct).$$

Otherwise, the weighting coefficient $F(Act_i)$ can be kept constant, for example equal to ½, thus making it possible to favour the blocks with weak texture vis-à-vis blocks with strong texture.

Furthermore, it is appropriate to note that the texture exhibits a maximum threshold value ($Thresh_{Act}=255$).

The combination of the two criteria based on the average luminance and the activity that are contained in the block can be effected, the spread of the information dedicated to the improvement layer then becomes:

$$COSTFlt = \sum_{i=0}^{i=M\times N-1} (costFlt_i) * F(Act_i) * F(Lavg_i)$$

The blockwise distribution being evaluated by means of a formula such as:

$$NbBitsfgs_i = throughput_{fgs} \times \frac{costFlt_i * F(Act_i) * F(Lavg_i)}{COSTFlt}$$

The amplitude of the motion vector associated with a block of pixels can also be taken into account when considering the quantity of bits allotted to this block of pixels in the enhancement layer.

This approach makes it possible to exploit the effect of masking through motion of the restitution defects inherent in the image coding, and in particular at low and very low throughput.

In fact, if a block of pixels is associated with a significant motion vector, then the zone of the image coded by this block may be considered to correspond to an element moving in the image and for which a lesser resolution than for the still zones of the image may be satisfactory.

The determination of the modulus of the motion vector $Vect_i$ associated with a block i is determined by means of a formula such as:

$$Vect_i = \sqrt{Vx^2 + Vy^2}$$

where Vx corresponds to the displacement in pixel units along the x axis, generally horizontal, and Vy corresponds to the displacement in pixel units along the y axis, generally vertical.

Application on the basis of the block effect measured on completion of the post-filtering can be effected by calculating a filtering cost, relating to the image, weighted with the amplitude of the vectors, for example by means of the following formula:

$$COSTFlt = \sum_{i=0}^{i=M\times N-1} (costFlt_i) * F(Vect_i)$$

The distribution of the number of bits allotted per block then becomes:

$$NbBitsfgs_i = throughput_{fgs} \times \frac{costFlt_i * F(Vect_i)}{COSTFlt}$$

$F(Vect_i)$ being a weighting function which varies between 0 and 1. In this example, if the norm of the motion vector $Vect_i$ of a block i is less than a threshold $Thresh_{vect}$, then this function $F(Vect_i)$ equals:

$$1-(Vect_i/Thresh_{Vect})$$

Otherwise, if the norm of this vector is greater than this threshold, this function is zero (F(Vect$_i$)=0).

Thus any block whose displacement vector has a norm that is less than a threshold Thresh$_{Vect}$ will be enhanced as a function of a cost and of its displacement whereas, if the vector is beyond a threshold, this block will have no additional enhancement layer.

It is appropriate to note that the value of the threshold is dependent, among other things, on the resolution of the image, a value of 30 giving acceptable results for an image in the CIF format (288 lines of 352 pixels).

Similarly, if a block of pixels that is situated at the border of the image is associated with a motion vector such that it is possible to anticipate that the zone of the coded image to which this block belongs will exit this image in the future, it is unnecessary to code this zone with a high resolution.

Hence, the position of a current block is estimated at the next image on the basis of the displacement vector of this block, for example by adding the components Vx and Vy of the vector Vect(Vx, Vy) respectively to the central coordinates of the block ib and jb.

Stated otherwise, if the central coordinates of the current block are ib and jb, the current block's central coordinates estimated at the next image are:

$$ib_{next}=ib+Vx$$

$$jb_{next}=jb+Vy$$

Thus, if the estimation of the coordinates for the next image exits the framework of the image ((ib$_{next}$<0) or (ib$_{next}$>M) or (jb$_{next}$<0) or (jb$_{next}$>N)), where M and N represent the dimensions of the image to be processed, then the block is not enhanced.

In accordance with the invention, various parameters have been described hereinabove which make it possible to determine a number of bits, that is allotted to a block of pixels, as a function of information coded in these blocks, such as a motion vector or significant contrasts, and/or of the quality of restitution of the image using the base layer.

Therefore, it is apparent that the number of bits in the enhancement layer can vary as a function of these parameters.

In order to control such variations, in one embodiment of the invention, use is made of models of variations of quality of restitution of an image to determine what quality of restitution is attained by the transmission of a base layer and of a variable enhancement layer, as explained hereinbelow with the aid of FIG. 4.

In this FIG. 4 is shown a fan of curves 402, 404 and 406 identifying a quality of restitution (ordinate axis 401, in dB), as a function of a number of bits allotted for a block (abscissa axis 403).

Each curve (respectively 402, 404 and 406) corresponds to a transmission of an image by means of a base layer (respectively at 192, 256 and 384 kbits/s) associated with an enhancement layer of increasing size.

This fan is generated from a curve 400 which represents the restitution quality/number of bits per block ratio when a single base layer is transmitted.

It is thus noted that, for one and the same quality, the transmission of a single base layer is more efficacious than the transmission of a base layer associated with an enhancement layer, this conveying the greater efficiency of the coding of the base layer with respect to the coding of the enhancement layer.

One also observes that the fan of curves 402, 404 and 406 exhibits an almost affine form such that the quality psnr of restitution of an image takes a form $$psnr=Dpsnr.x+b$$

where Dpsnr is a constant, equal to 0.212 dB/bit per block and x represents the allotted number of bits per block.

It should be noted that this constant Dpsnr, which makes it possible to approximate the variation of restitution quality/throughput fgs, corresponds to a type of algorithm making it possible to undertake compression of fine scalability type.

However, it is also appropriate to note that this constant is dependent on the compression algorithm implemented.

Thereupon, it is possible to determine simply the number of bits that have to be allocated to an image, or to each block of this image, to obtain a given quality of restitution.

In fact, by fixing a determined quality psnr$_{det}$ of restitution, it is possible to estimate the number of bits per block that have to be allotted to a block in the enhancement layer by calculating the deviation between the number of bits per block transmitted in the base layer (curve 400) and the number of bits per block that have to be transmitted to obtain the required quality of restitution.

Such a procedure for the graphical determination of the number of bits that have to be allotted in the enhancement layer to obtain a given quality of restitution is particularly simple since it requires a limited calculation capacity.

Moreover, it makes it possible to limit the number of bits that is allotted in the enhancement layer to a block of pixels by again optimizing the efficiency of the coding of this layer since it makes it possible to avoid overcoding a block by determining, in a required compression quality context, whether the restitution quality thereof has already attained the required quality.

This technique can take into consideration the combination of weighting parameters of two or more of the already described parameters relating to the block currently being coded, namely block effects, a filtering cost, the local average luminance, the local activity, an amplitude of the motion vector and/or a risk of exiting the scene in the next image.

The present invention is open to numerous variants. Thus, the position and/or the function of the image to which a pixel block belongs can also be a parameter considered in determining the quantity of bits of the enhancement layer allotted to a block.

In fact, if an image is used to generate other images, as in the particular case of a predictive coding scheme where an inter-image uses images reconstructed with the aid of their base layer and of all or part of their enhancement layer, the blocks of this image are processed with a lower enhancement layer if these blocks belong to an isolated image or to one situated at the end of a series of images.

What is claimed is:

1. Device for compressing a source image comprising,
a receiver for coding a base layer of the source image, and
a signal generator for generating an enhancement layer by coding a residual existing between the source image and a base image of the base layer, the source image and the base image being structured as blocks of pixels, wherein a number of bits is allotted to the enhancement layer of a block (k), such number depending on a quality (psnr$_k$) of restitution of the block (k), determined by comparing the block in the source image with the block in the base image coded and reconstructed using the base layer.

2. Device according to claim 1, the device configured to determine the quality ($psnr_k$) of restitution of the block (k) using the following formula:

$$psnr_k = -10\mathrm{Log}\left(\sum_{i,j=0}^{i,j=7}(block_{k,source}(i,j) - block_{rec}(i,j))^2\right)/(L^2 \times 64)$$

where (i,j) represents the coordinates of a pixel of the block (k) considered in the source image ($block_{source}$) or in the base image ($block_{rec}$) coded by the base layer, L representing the value of the maximum luminance of the image.

3. Device according to claim 1, the device further configured to define an average quality ($Psnr_{avg}$) of restitution of the image and configured to allocate a greater number of bits in the enhancement layer to the blocks whose restitution quality is less than the average quality ($Pnsr_{avg}$) or than a reference quality ($Pnsr_{ref}$) obtained on the basis of the average quality.

4. Device according to claim 1, the device further configured to compare the quality ($psnr_k$) of restitution of the block k with a predefined reference quality ($psnr_{ref}$), to detect a difference ($\delta psnr_k$) of quality with respect to the reference quality ($psnr_{ref}$), and configured to allott said number ($NbBits_k$) of bits of the enhancement layer to the block as a function of the deviation.

5. Device according to claim 4, the device further configured to allott a number ($NbBits_k$) of bits of the enhancement layer by using a proportionality relation:

$$NbBits_k = \frac{\delta psnr_k}{\Delta psnr} \times throughput_{fgs}$$

where throughput fgs is the quantity of bits per image contained in the train of the enhancement layer and $\Delta psnr$ is a sum of differences ($\delta psnr_k$) measured for the block considered.

6. Device according to claim 1, wherein the number of bits depends on the level of block artefacts between neighbouring blocks, corresponding to a filtering cost representing the difference between the filtered block and the non filtered block in the base layer.

7. Device according to claim 6, the device further configured to estimate the cost (CostFlti) of the filtering with the aid of a formula:

$$costFlt_i = \frac{\left(\sum_{i,j=0}^{i,j=7} \mathrm{abs}(block^i_{baseFiltered}(i,j) - block^i_{base}(i,j))\right)}{64}$$

where abs is the absolute value function, and $block_{basefiltered}$(i,j)–$block_{base}$(i,j) represents the difference in values of the pixel with coordinates i and j of the base layer after filtering and before filtering.

8. Device according to claim 6, wherein the number of bits allotted to the enhancement layer of said block is a function of a parameter relating to an average luminance (Lavg) associated with the block.

9. Device according to claim 8, the device further configured to weight the cost of the filtering of a block as a function of the average luminance of the block.

10. Device according to claim 6, wherein the weighting cost of the filtering as a function of the texture, or activity, of the considered block of pixels.

11. Device according to claim 1, wherein the number of bits is a function of at least a component value of a motion or displacement vector associated with each pixel block.

12. Device according to claim 1, wherein the number of bits depends on the position of the block in a subsequent image obtained through extrapolation.

13. Device according to claim 1, the device further configured to estimate the quality (psnr) of restitution of a block of pixels with the aid of an affine modelling such that the quality (psnr) of restitution of an image has a linear form:

$$psnr = Dpsnr.x + b$$

where Dpsnr is a constant and x represents the allotted number of bits per block.

14. Device according to claim 1, wherein the number of bits depends on the use of the image which the block belongs to, as a reference image, when other images use inter-image predictive coding mode.

15. Device according to claim 1, the device further configured to code the base layer with the aid of a discrete cosine transform (DCT).

16. Method for compressing a source image, the method comprising coding a base layer of the source image in a receiver, and generating an enhancement layer in a generator by coding a residual existing between the source image and a base image of the base layer, the source image and the base image being structured as blocks of pixels, wherein the coding of a residual comprises comparing a block in the source image with the coding and reconstructing of said block in the base layer to determine a quality of a restitution of said block, and allotting a number of bits to an enhancement layer for the coding of said block as a function of said quality of restitution, where said quality of restitution is determined by comparing said block in the source image with the block in the base image coded and reconstructed using the base layer.

17. The method according to claim 16, the method further comprising defining an average quality ($Psnr_{avg}$) of restitution of the image and allocating a greater number of bits in the enhancement layer to the blocks whose restitution quality is less than the average quality ($Pnsr_{avg}$) or than a reference quality ($Pnsr_{ref}$) obtained on the basis of the average quality.

18. The method according to claim 16, the method further comprising comparing the quality ($psnr_k$) of restitution of the block k with a predefined reference quality ($psnr_{ref}$), to detect a difference ($\delta psnr_k$) of quality with respect to the reference quality ($psnr_{ref}$), and configured to allotting said number ($NbBits_k$) of bits of the enhancement layer to the block as a function of the deviation.

19. The method according to claim 16, wherein the number of bits depends on the level of block artefacts between neighbouring blocks, corresponding to a filtering cost representing the difference between the filtered block and the non filtered block in the base layer.

20. The method according to claim 19, wherein the number of bits allotted to the enhancement layer of said block is a function of a parameter relating to an average luminance (Lavg) associated with the block.

21. The method according to claim 20, the method further comprising weighting the cost of the filtering of a block as a function of the average luminance of the block.

22. The method according to claim 20, wherein the weighting the cost of the filtering is a function of the texture, or activity, of the considered block of pixels.

23. The method according to claim 16, wherein the number of bits is a function of at least a component value of a motion or displacement vector associated with each pixel block.

24. The method according to claim 16, wherein the number of bits depends on the position of the block in a subsequent image obtained through extrapolation.

25. The method according to claim 16, the method further comprising estimating the quality (psnr) of restitution of a block of pixels with the aid of an affine modelling such that the quality (psnr) of restitution of an image has a linear form:

$$psnr = Dpsnr.x + b$$

where Dpsnr is a constant and x represents the allotted number of bits per block.

26. The method according to claim 16, wherein the number of bits depends on the use of the image which the block belongs to, as a reference image, when other images use inter-image predictive coding mode.

27. The method according to claim 16, the method further comprising coding the base layer with the aid of a discrete cosine transform (DCT).

28. Device according to claim 1, the device configured to determine the quality of restitution of the block based on the coordinates of a pixel of the block considered in the source image or in the base image coded by the base layer, and the maximum luminance of the image.

29. Device according to claim 1, the device further configured to to allott a number of bits of the enhancement layer by using a proportionality relation.

30. Device according to claim 6, the device further configured to estimate the cost of the filtering based on an absolute value function, and a difference in values of the pixel with coordinates i and j of the base layer after filtering and before filtering.

31. The method according to claim 16, wherein the quality of restitution of the block is determined based on the coordinates of a pixel of the block considered in the source image or in the base image coded by the base layer, and the maximum luminance of the image.

32. The method according to claim 16, wherein allotting the number of bits of the enhancement layer is determined by using a proportionality relation.

33. The method according to claim 19, further comprising estimating the cost of the filtering based on an absolute value function, and a difference in values of the pixel with coordinates i and j of the base layer after filtering and before filtering.

* * * * *